United States Patent Office 2,783,590
Patented Mar. 5, 1957

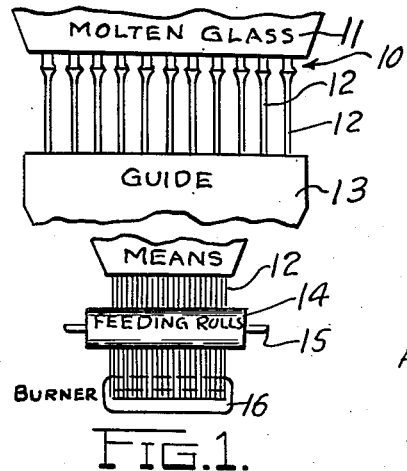
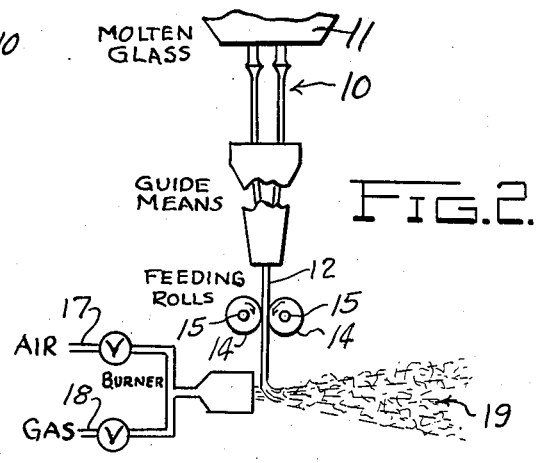
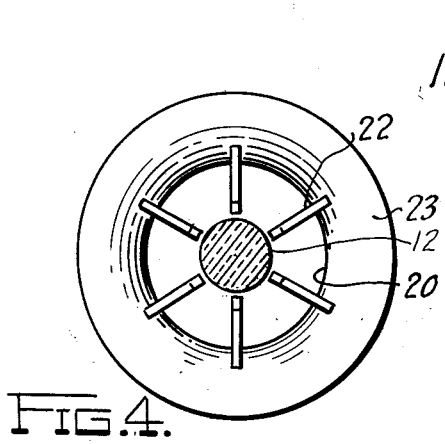
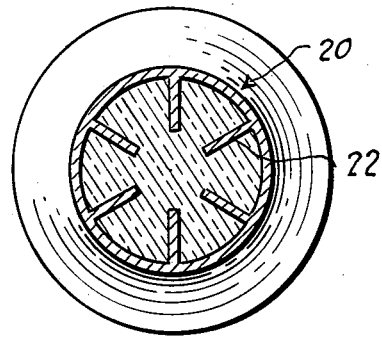
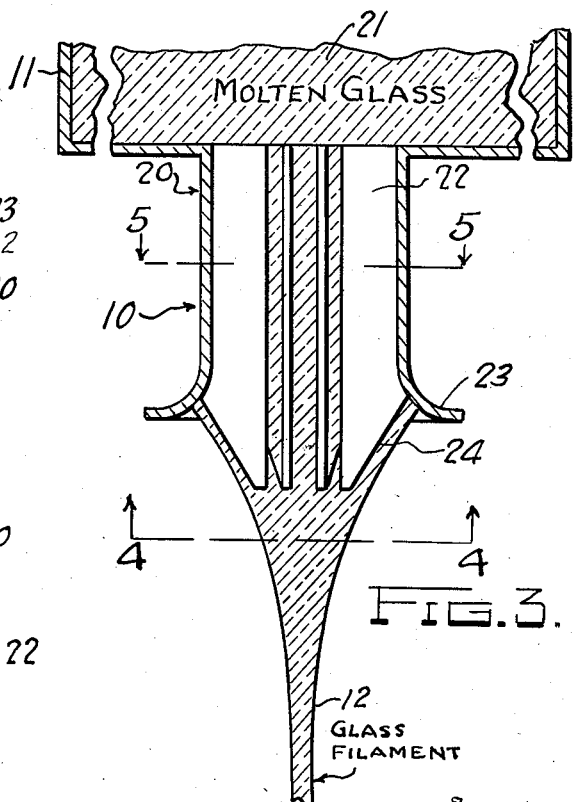

2,783,590

FIBER FORMING APPARATUS

Charles J. Stalego, Newark, Ohio, assignor to Owens-Corning Fiberglas Corporation, a corporation of Delaware Application March 4, 1953, Serial No. 340,193

1 Claim. (Cl. 49—17)

This invention relates to fiber forming apparatus and more particularly to apparatus for the formation of relatively large sized continuous filaments from molten material by drawing the filaments from a mass of the molten material.

The formation of fine diameter glass fibers, for example, by allowing molten glass to pour through minute orifices and then pulling on the fibers formed as the glass congeals to attenuate the streams and to draw fibers from the streams of molten glass, has become an accepted manner for the formation of fine glass fibers. Such fibers are pulled at speeds up to 10,000 feet per minute and are combined, usually in numbers up to, say, 200, to form individual strands which may then be further combined and/or twisted in various subsequent operations.

The same general process has been used for forming large diameter glass filaments, say in the order of .015" or more, where the fibers are pulled from larger streams of molten glass and at lower rates of speed. Where the mass of molten glass pouring through an orifice is as large as that needed to form a large diameter filament, the problems of heat control are multiplied many times. The mass of glass from which an individual filament is being formed is large enough to retain a considerable quantity of its heat. Since glass is a poor conductor, and because the material, usually metal, through which the filament forming orifice extends usually is heated by the passage of current therethrough, heat is not lost from the filament under close enough control to insure the viscosity of the glass being raised to the range wherein the stream can be attenuated with certainty and mechanical stability.

Loss of such control frequently results in undue variations in filament characteristics and may even cause disruption of the attenuation process.

Various attempts have been made to control the temperature of the glass as it flows through the stream defining orifice. It is to this end that the apparatus of the instant invention is directed.

The principal object of the instant invention is to provide an orifice forming structure which will withdraw heat relatively uniformly from the mass of glass passing through the orifice and carry the heat away from the glass to permit its rapid radiation and loss.

It is a further object of this invention to provide an orifice structure having glass cooling means which are submerged in the mass of glass flowing through the orifice.

Yet another object of this invention is to provide a filament forming apparatus in which a multiplicity of large diameter filaments can be simultaneously formed from a mass of molten glass and wherein the temperature of the smaller mass of glass from which each of the filaments is formed can be reduced under controlled conditions so as to increase its viscosity to the proper range for attenuating the individual filaments.

These and more specific objects and advantages will be apparent from the specification which follows and from the drawings, in which:

Fig. 1 is a fragmentary view in elevation of filament forming orifice structures embodying the invention as employed for the formation of a plurality of large diameter glass filaments and illustrating one manner of subsequent treatment of the filaments.

Fig. 2 is a fragmentary side view of the apparatus shown in Fig. 1.

Fig. 3 is a fragmentary vertical sectional view on an enlarged scale of an individual filament forming orifice structure embodying the invention.

Fig. 4 is a bottom view taken substantially along the line 4—4 of Fig. 3.

Fig. 5 is a horizontal sectional view taken substantially on the line 5—5 of Fig. 3.

Filament forming orifice structures 10 embodying the invention may advantageously be used in connection with a molten glass containing tank 11 in which a quantity of glass is kept in a molten temperature-controlled condition. From each of the orifice structures 10 an individual stream of glass flows and an individual relatively large diameter filament 12 is formed from each of the streams pouring through one of the structures 10 by drawing the glass downwardly from the stream. In the apparatus of Figs. 1 and 2 the filaments 12 are led through guide means 13 and then between a pair of feeding rolls 14 mounted upon parallel axes 15 and rotated in the direction of the arrows (Fig. 2) to feed the filaments 12 downwardly.

The feeding action of the rolls 14 not only feeds the filaments 12 downwardly after they have been attenuated from the streams of glass but it also pulls on the filaments 12 with steady tractive force to draw the glass and attenuate the streams. By careful control of the temperature of the glass in the molten glass tank 11, the constituents of the glass, the speed of the feeding rolls 14 and the temperature of the glass in transit through the orifice structures 10 according to the invention, the diameter of the individual filaments 12 and their temperature as they leave the feeding rolls 14 can be nicely controlled.

After the filaments 12 leave the feeding rolls 14, they may be treated in various manners, for example, they may be fed downwardly past a burner 16 having air and gas inlets 17 and 18, respectively, where the blast of flame being propagated at a high rate of speed shreds the filaments 12 to form a very finely divided fibrous mass generally indicated at 19 and which may, in turn, be collected for the manufacture of high quality insulation, flotation and filtering materials, etc.

The actual formation of the fibrous mass 19 does not constitute part of the instant invention nor does the guide means 13 or feeding rolls 14, these mechanisms being shown in the drawings only to illustrate how individual filaments 12 formed by orifice structures embodying the invention may be utilized.

Each of the orifice forming structures 10 (Figs. 3-5) consists of a tube 20 having a vertical axis and in open communication with the interior of the molten glass tank 11. Glass 21 in the tank 11 flows by force of gravity downwardly into the upper end of the tube 20 and continues to flow downwardly through the tube 20 by reason of the pressure of the head of glass in the tank 11.

The tube 20 has a plurality of axially extending radial vanes 22. Six vanes 22 are shown in the tube 20 in Figs. 3-5, although the precise number of vanes 22 is not a critical part of the invention, it being dictated by desired heat loss, practicable dimensions of the orifice structures 10, and other considerations in accordance with the discussion herein and with the techniques of the glass makers art.

At the bottom of the tube 20 its lower edge is flared outwardly to form a bell 23 and the vanes 22 may continue along the wall of the tube 20 and bell 23 to some point at or beyond the line at which the wall of the tube 20 begins to flare to form the bell 23. Each of the vanes 22 has an angularly extending lower edge 24 which inclines inwardly towards the axis of the tube 20 from the bell 23 and which protrudes below the horizontal level of the bell 23. The particular angularity of the edge 24 of the vane 22 and the distance of protrusion beyond the level of the bell 23 again are not critical. This angle and distance may be arrived at by experimentation for the particular consistency, melting temperature and attenuating temperature of the glass being treated and also by the relationship between the diameter of the orifice structure 20 and the diameter of an individual finished filament 12 to be attenuated from the stream flowing through the structure 20.

In the embodiment of the invention illustrated in the drawings, the vanes 22 do not extend inwardly completely to the axis of the tube 20 but are of a diametric width equal to perhaps one-third of the diameter of the tube 20, leaving an unobstructed axial section in the tube 20 equal in diameter to about one-third of the diameter of the tube 20.

In the structure of the drawings each of the vanes 22 is welded, or soldered, or otherwise secured to or integral with the tube 20. Intimate contact between the vanes 22 and the tube 20 is essential for effective transferral of heat from the vanes 22 to the tube 20. Each of the vanes 22 is relatively thin, circumferentially of the tube 20, so as to present a substantial heat transferral surface to the mass of glass flowing along both sides of the vane 22.

As can best be seen in Fig. 3, when glass at the molten temperature flows downwardly through the orifice structure 20 it flows on three sides of each of the vanes 22 and along the wall of the tube 20. As the glass flows downwardly heat is transferred from the glass to the wall of the tube 20 and to the vanes 22. Radiation from the tube 20 dissipates both heat which is transferred directly to the wall and heat which is conducted to the wall of the tube 20 by the vanes 22.

The radial extent of the vanes 22 into the mass or heart of the glass flowing through the orifice structure 10 results in withdrawing heat from substantially the entire mass of glass during its passage from the pool of glass in the tank 11 to the bottom end of the orifice structure 10.

In Fig. 3 it can be seen how the molten glass being attenuated into a filament 12 and drawn away by longitudinal movement of the filament 12 forms a generally cone-shaped mass extending downwardly from and coaxial with the orifice structure 20 and the filament 12 being pulled and attenuated from the mass of glass. It will be observed in Fig. 3 also that the angular edges 24 of the vanes 22 preferably are so directed as to remain submerged within the cone of glass.

The attenuation of the individual glass filament 12 depends not only upon the speed at which it is linearly drawn but upon its losing sufficient heat so as to gradually solidify and thus be stretched and attenuated a controlled amount between the time when the mass of glass is at its molten temperature within the tank 11 and when the glass reaches a sufficiently lower temperature at the point of final reduction of diameter and formation of the individual filament 12. If the mass of glass is too hot, cools too slowly, or is drawn away too slowly; if its temperature is too low or the speed too high or the glass loses its heat too rapidly, the fiber may be drawn out too fine, be uneven, or it may be pulled apart. Such variations render the filaments mechanically unstable.

With the speed of pulling easy to control and temperature and ingredients of the glass within the tank 11 relatively easy to control, the critical condition of the process of formation of filaments in this manner is in the heat loss between the time when the glass leaves the tank 11 and its formation into a filament 12. As mentioned above, where the diameters of the filaments to be formed are very fine, less careful temperature control is necessary because the fibers are drawn at, say, 10,000 feet per minute, and they form and are attenuated so rapidly that they can be pulled almost directly from the mass of glass without cooling it at all.

Conversely, however, as in the case of forming large diameter filaments 12, temperature control is highly important and an orifice forming structure according to the invention provides for the substantially uniform withdrawal of heat from the mass of glass as it passes downwardly from the tank 11 and as it begins to be attenuated to form a filament, permitting precisely controlled temperature changes in the glass as it flows through the orifice.

I claim:

A structure for forming a single glass filament from a mass of molten glass comprising a hollow tubular metal body extending downwardly from a molten glass container and communicating therewith, said body having an open lower end and a plurality of heat absorbing radial vanes attached to the inner wall of said body and extending axially at least through part of said body and beyond the lower open end thereof for absorbing heat from the glass passing therethrough and conducting the heat to said wall.

References Cited in the file of this patent

UNITED STATES PATENTS

| 2,462,805 | Danner | Feb. 22, 1949 |
| 2,596,042 | Park | May 6, 1952 |

FOREIGN PATENTS

| 381,582 | Great Britain | Sept. 29, 1932 |
| 543,172 | Great Britain | Feb. 12, 1942 |